United States Patent
Niu et al.

(10) Patent No.: US 12,144,052 B2
(45) Date of Patent: Nov. 12, 2024

(54) METHODS OF TYPE 1 UL GAP TRIGGERING IN FR2

(71) Applicant: APPLE INC., Cupertino, CA (US)

(72) Inventors: Huaning Niu, Cupertino, CA (US); Dawei Zhang, Cupertino, CA (US); Jie Cui, Cupertino, CA (US); Laxminarayana Pillutla, San Diego, CA (US); Manasa Raghavan, Cupertino, CA (US); Qiming Li, Beijing (CN); Sharad Sambhwani, San Diego, CA (US); Xiang Chen, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,402

(22) PCT Filed: Jul. 27, 2021

(86) PCT No.: PCT/CN2021/108762
§ 371 (c)(1),
(2) Date: Sep. 17, 2021

(87) PCT Pub. No.: WO2023/004603
PCT Pub. Date: Feb. 2, 2023

(65) Prior Publication Data
US 2024/0032131 A1    Jan. 25, 2024

(51) Int. Cl.
*H04W 76/20* (2018.01)
*H04W 8/24* (2009.01)
*H04W 52/36* (2009.01)

(52) U.S. Cl.
CPC ............. *H04W 76/20* (2018.02); *H04W 8/24* (2013.01); *H04W 52/365* (2013.01); *H04W 52/367* (2013.01)

(58) Field of Classification Search
CPC ..... H04W 76/20; H04W 8/24; H04W 52/365; H04W 52/367; H04W 24/02
(Continued)

(56) References Cited

U.S. PATENT DOCUMENTS

2017/0339712 A1* 11/2017 Rico Alvarino ...... H04W 72/23
2022/0182961 A1*  6/2022 Dai ....................... H04L 5/0048
2022/0337278 A1* 10/2022 Caporal Del Barrio .....................
                                                H04W 36/0072

FOREIGN PATENT DOCUMENTS

CN        101651877 A    2/2010
CN        110463260 A   11/2019
(Continued)

OTHER PUBLICATIONS

Apple, "UL gaps for Tx power management: RRM aspect", R4-2109363, 3GPP TSG-RAN WG4 Meeting #99-e, Electronic Meeting, Agenda Item 9.4.7.3, May 19-27, 2021, 4 pages.
(Continued)

*Primary Examiner* — Rownak Islam
(74) *Attorney, Agent, or Firm* — Dorsey & Whitney LLP

(57) ABSTRACT

Triggering an uplink (UL) gap at a base station may include decoding a user equipment (UE) UL gap capability report received from a UE. A radio resource control (RRC) UL gap configuration for transmission to the UE may be encoded. The RRC UL gap configuration may include configuration information associated with at least one of a periodicity, offset, or length. Measurement information received from the UE may be decoded. The measurement information may include at least one of a power headroom value, a $P_{CMAX,f,c}$ value, or a P value. Based on the power headroom value, the $P_{CMAX,f,c}$ value, or the P value, the UL gap configuration may be activated by encoding a medium access control (MAC) control element (MAC CE) for transmission to the UE.

17 Claims, 6 Drawing Sheets

(58) Field of Classification Search
USPC ........................................................ 370/329
See application file for complete search history.

(56) References Cited

FOREIGN PATENT DOCUMENTS

| | | |
|---|---|---|
| CN | 110740050 A | 1/2020 |
| CN | 110856200 A | 2/2020 |
| WO | 2021076237 A1 | 4/2021 |

OTHER PUBLICATIONS

PCT/CN2021/108762, International Search Report and Written Opinion, Mar. 29, 2022, 9 pages.
Samsung, "Framework to support bandwidth parts in NR", R2-1711187, 3GPP TSG-RAN WG2 NR #99bis Meeting, Prague, Czech Republic, Agenda Item 10.2.3, Oct. 9-13, 2017, 8 pages.

* cited by examiner

METHODS OF TYPE 1 UL GAP TRIGGERING IN FR2

TECHNICAL FIELD

This application relates generally to wireless communication systems, including triggering uplink gaps.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

Frequency bands for 5G NR may be separated into two or more different frequency ranges. For example, Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

By way of background, uplink (UL) gaps for self-calibration and monitoring purposes may be particularly desirable. In particular, such self-calibration and monitoring purposes may include: 1. PA efficiency and power consumption; 2. Transceiver calibration due to temperature variation; and 3. UE Tx power management. Notably, such self-calibration and monitoring associated with UL gaps may not preclude other self-calibration and monitoring. Accordingly, the principles described herein include various metrics to be used in determining whether to activate or deactivate a UL gap.

Figure 1:
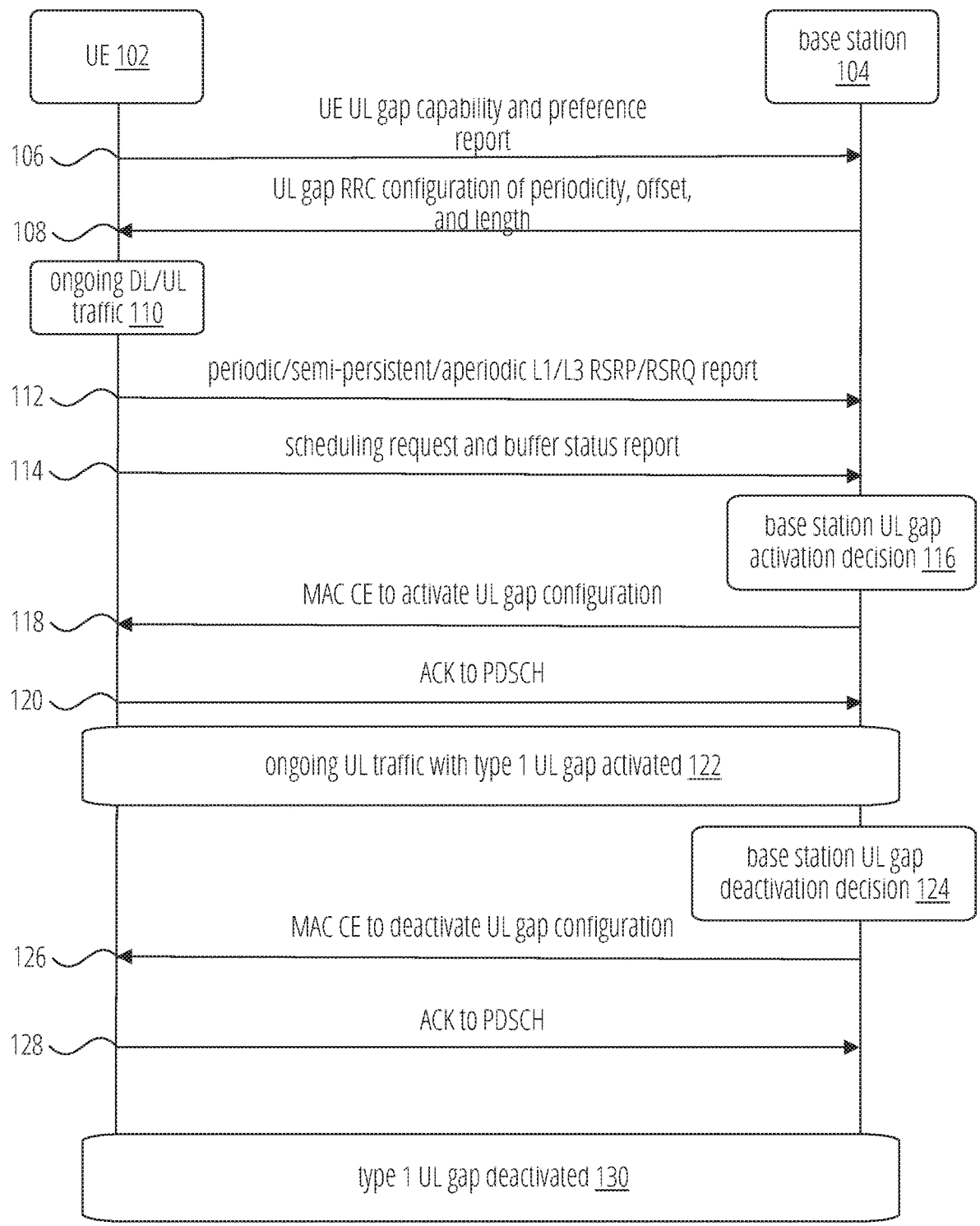
FIG. 1 illustrates a data flow chart for triggering an uplink gap in accordance with one embodiment.

FIG. 1 illustrates on overall message flow for configuring and activating/deactivating a UL gap (e.g., a type 1 UL gap). Activating a UL gap may also include a network trigger, as further described with respect to FIG. 1. As shown, FIG. 1 includes a UE 102 and a base station 104 (e.g., a gNB). Configuring a UL gap may be performed via radio resource control (RRC) configuration based on a given UE's capabilities and/or gap preferences. Accordingly, the UE 102 may indicate a desire for a UL gap for body proximity sensing (BPS) in frequency range 2 (FR2) to the base station 104, in addition to the UE providing a report associated with the UE's preferred UL gap configuration, as represented by arrow 106. Upon receiving such information from the UE, the base station 104 may then configure a UL gap periodicity, offset, and length through an RRC configuration, as represented by arrow 108. In the meantime, ongoing UL/downlink (DL) traffic may be sent between the UE 102 and the base station 104, as represented by block 110. The UE 102 may eventually send one or more measurement reports (layer 1 (L1)/layer 3 (L3)) on a periodic, semipersistent, or aperiodic basis, as well as a scheduling request and a buffer status report, as represented by arrow 112 and arrow 114, respectively.

As represented by block 116, the base station 104 may make a UL gap activation decision (i.e., based on various factors/triggers, as further discussed herein). Notably, the base station may trigger activation of a UL gap through a medium access control element (MAC CE). In some embodiments, the base station 104 may determine that a UL gap is to be activated for BPS measurement based on: 1. A cell edge condition (e.g., L1-RSRP, L3-RSRP, L1-RSRQ, or L3-RSRQ); 2. A UE traffic condition (e.g., a UE buffer status report); and/or 3. A UE being capable of tdd-MPE-P-MPR-Reporting-r16, as supported in 3GPP Release 16 (Rel-16), report a P-MPR>0. (e.g., the UE observes power management maximum power reduction (P-MPR) is needed to meet MPE).

Accordingly, as represented by arrow 118, the base station 104 may send a PDSCH carrying the MAC CE comment to activate the UL gap. The UE may then decode the PDSCH carrying the MAC CE and send an acknowledgement (ACK) back to the base station, as represented by arrow 120. The UL gap may then be activated until a de-activation MAC CE is sent to the UE. In addition, while the UL gap is activated, ongoing UL traffic may continue, as represented by block 122.

As represented by block 124, the base station 104 may make a UL gap deactivation decision. Notably, the base station may also trigger deactivation of a UL gap through a MAC CE. Accordingly, as represented by arrow 126, the base station 104 may send a PDSCH carrying the MAC CE to deactivate the UL gap. The UE may then decode the PDSCH carrying the MAC CE and send an ACK back to base station, as represented by arrow 128. The UL gap may then be deactivated until another activation MAC CE is sent to the UE, as represented by block 130.

While cell edge conditions, UE traffic conditions, and whether a UE capable of tdd-MPE-P-MPR-Reporting-r16 reports a P-MPR>0 are discussed as metrics to be used to determine whether to activate a UL gap for BPS measurement, the principles described herein include three additional metrics for making such a determination. The three additional metrics include power headroom (PH), $P_{CMAX,f,c}$, and P field. On de-activation, the cell edge condition, UE traffic condition and power headroom/Pcmax,f,c can be used together or individually for the network to determine whether UL gap can be de-activated. Note, comparing to activation, the key difference here is that P-MPR or P field may not be used for de-activation, since P-MPR=0 might mean the UE performed BPS sensing and no target is found nearby.

As briefly discussed, power headroom may be used as a metric for determining whether to start/activate a UL gap for BPS measurement. Notably, the PH field indicates the power headroom level and has a length of six bits The length of the field is 6 bits (reported PH and corresponding power headroom levels are shown in 3GPP TS 38.321 Table 6.1.3.8-1). With respect to the use of PH as a metric, a small PH may imply that a UE is at the cell edge and thus, higher power may be desirable. Accordingly, a network may activate a UL gap when the PH of a UE is small (and thus, the UE buffer status report (BSR) is high).

As briefly discussed, $P_{CMAX,f,c}$ may also be used as a metric for determining whether to activate a UL gap for BPS measurement. Notably, the $P_{CMAX,f,c}$ field may indicate the $P_{CMAX,f,c}$ (as specified in 3GPP TS 38.213 [6]), which is used for calculation of the previously discussed PH field. The reported $P_{CMAX,f,c}$ and the corresponding nominal UE transmit power levels are shown in 3GPP TS 38.133 Table 6.1.3.8-2 while the corresponding measured values in dBm are specified in 3GPP TS 38.133 [11]). In addition, $P_{CMAX,f,c}$ may be determined after maximum power reduction (MPR) or P-MPR is applied.

With respect to the use of $P_{CMAX,f,c}$ as a metric, the $P_{CMAX,f,c}$ may be based on MPR or P-MPR (i.e., $P_{CMAX,f,c}$ may be determined after MPR or P-MPR is applied. Accordingly, when a P value (as further described below with respect to the P value as a metric) is equal to zero (i.e., no P-MPR), a lower $P_{CMAX,f,c}$ may indicate a low UE effective isotropic radiated power (EIRP), which may further indicate that a gNB is not to activate a UL gap. In contrast, when the P value is equal to zero, a high $P_{CMAX,f,c}$ may indicate a high UE EIRP, which may cause a gNB to activate a UL gap as the desire for a BSR may be high. When the P field/value is equal to one, the P field/value may be used as a metric (i.e., the third additional metric), as further described below.

With respect to use of the "P" field as a metric (as further described in 3GPP Release (Rel-15), the P field may indicate whether P-MPR has been applied. More specifically, if mpe-Reporting-FR2 is configured and a serving cell operates on FR2, a MAC entity may set the P field to zero if the applied P-MPR value is less than P-MPR 00 (as specified in 3GPP TS 38.133) or to meet MPE requirements (as specified in 3GPP TS 38.101-2), and the MAC entity may set the P field to one otherwise. If mpe-Reporting-FR2 is not configured or the serving cell operates on FR1, the P field may indicate whether power backoff is applied due to power management (as allowed by P-MPRc and specified in 3GPP TS 38.101-1, 3GPP TS 38.101-2, and 3GPP TS 38.101-3). In addition, the MAC entity may set the P field to one if the corresponding $P_{CMAX,f,c}$ field would have had a different value if no power backoff due to power management had been applied.

Accordingly, the P field may be used as a metric when a UE does not support the Rel-16 optional feature of an P-MPR report. In addition, when the P field is set, P-MPR may be assumed as being applied. As such, the network can activate a UL gap if the P field is set when the UE does not support the optional Rel-16 P-MPR report, or the network can activate the UL gap based on the P-MPR report.

As described herein, the network may use a MAC CE to activate and deactivate a UL gap. As part of such MAC CE, a logical channel identification (LCID) may be defined for downlink shared channel (DL-SCH) in either an LCID table, or an extended LCID (eLCID) table. The Activation/deactivation MAC CE may be identified by a MAC subheader with LCID, as shown in Table 1 (and further specified in 3GPP TS 38.321 Table 6.2.1-1) associated with an LCID table and/or Tables 2 and 3 (and further specified in 3GPP TS 38.321 Table 6.2.1-1a and Table 6.2.1-1b, respectively) associated with an eLCID table, with the following possibilities: 1. Utilizing one bit to activate and/or deactivate when only one UL gap is RRC configured; 2. Utilizing a bit map to activate and/or deactivate when multiple UL gap configurations are configured via RRC; and/or 3. Utilizing a fixed size MAC CE for UL gap configuration.

Other than the metrics used by the network to determine whether a UL gap should be activated or de-activated, the UE can transmit an explicit request to activate/de-activate the UL gap. A UL MAC CE can be defined for this purpose. As part of such MAC CE, a logical channel identification (LCID) may be defined for uplink shared channel (UL-SCH) in either an LCID table, or an extended LCID (eLCID) table.

The MAC CE can be fixed size of 8 bits long, with 1 bit indicating activation/de-activation and the remaining bits being reserved.

Alternatively, when UE-specific RRC configuration does not occur, a MAC CE can be used to both activate and configure together, with the following possibilities: 1. Utilizing one bit to activate and/or de-activate per UL gap type; 2. Utilizing the bit field length to indicate the UL configuration (e.g., gap configuration index and offset); and/or 3. Utilizing a variable/flexible size MAC CE.

TABLE 1

| Codepoint/Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

TABLE 2

| Codepoint | Index | LCID values |
|---|---|---|
| 0 to $(2^{16} - 1)$ | 320 to $(2^{16} + 319)$ | Identity of the logical channel |

TABLE 3

| Codepoint | Index | LCID values |
|---|---|---|
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Indication |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

As briefly described herein, a UE may provide gap preferences/capabilities. In an example, gap configuration candidates may include: 1. A gap periodicity of: 5 ms, 10 ms, 20 ms, 40 ms, 80 ms, 160 ms, 320 ms, and so forth; and 2. A gap duration of: 62.5 us, 125 us0, 250 us, 500 us, 1000 us, and so forth. Notably, while particular examples of gap periodicity and gap duration are provided above, any appropriate gap periodicity and/or gap duration may be utilized when practicing the principles described herein.

Figure 2:
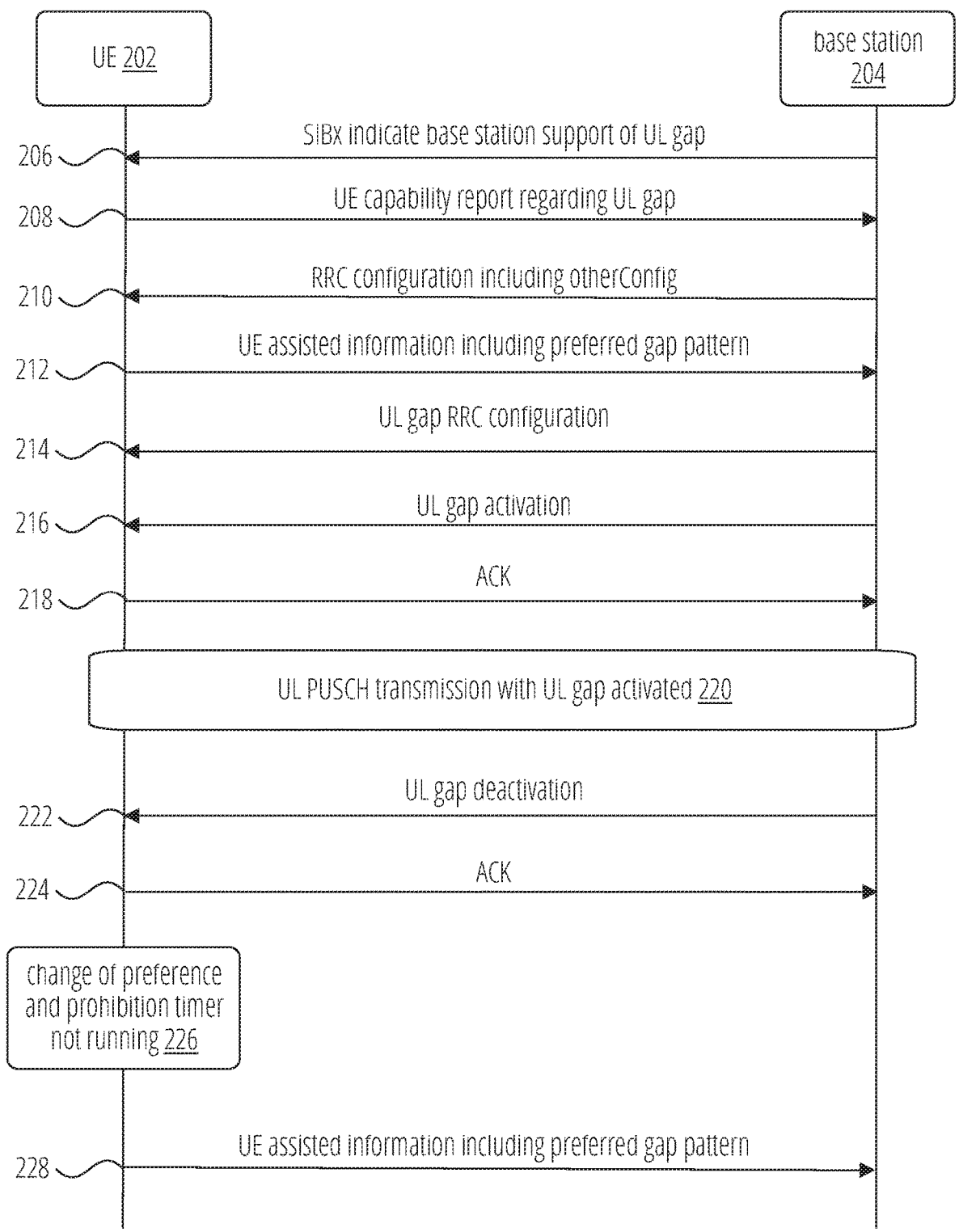
FIG. 2 illustrates a data flow chart for triggering an uplink gap in accordance with one embodiment.

FIG. 2 illustrates an overall message flow for UL gap configuration that includes UE capabilities/preferences. As shown, FIG. 2 includes a UE 202 and base station 204. As shown, the base station 204 may indicate support of a UL gap, in some embodiments, as represented by arrow 206. Such indication by the base station can be carried in SIBx. Alternatively, such indication may be in UE-specific RRC signaling. In addition, the indication may correspond to a per gap type or per UL gap use case.

As shown by arrow 208, the UE 202 may send a UE capability message indicating a UL gap use case and/or a gap type. In some embodiments, a UE can indicate the capability of supporting only a subset of UL gap configuration, for example, only support 4 combinations of gap length and periodicity: 1000 us gap length with 40 and 80 ms periodicity, and 250 us gap length with 40/80 ms periodicity. In some embodiments, the UE may be limited to sending a UL gap capability in response to a base station indicating support of a UL gap. In other embodiments, a UE may send UL gap capability message without having to first receive a message indicating UL gap support by a base station.

In response to receiving/decoding the UE capability report, the base station 204 may send an RRC reconfiguration message including otherConfig (which is further described below), as represented by arrow 210. Notably, such message may allow for the UE to provide feedback in the form of a preference configuration for a UL gap per use case or per gap type.

Accordingly, the UE 202 may then send UE assisted information (UAI) that includes a preferred gap pattern (e.g., UL gap per use case or per gap type), as represented by arrow 212. Regarding such UE feedback preference, the UE may determine a preferable gap configuration based on a tradeoff of overhead and accuracy along with any other applicable network configuration. For instance, such determination by the UE may consider: 1. A UE specific BPS implementation; 2. A UE peak EIRP; 3. ULDL time division duplex (TDD) configurations; 4. Measurement gap configurations; and any other applicable factors.

The base station 204 may then determine a proper UL gap RRC configuration based on UE capability and/or UE preference and signal the configuration to the UE 202, as represented by arrow 214. The base station 204 may then perform UL gap activation as further described herein, as represented by arrow 216. In response, the UE 202 may send an ACK to the base station 204. A UL physical uplink shared channel (PUSCH) transmission may then be performed with the UL gap activated, as represented by block 220.

Eventually, the UL gap may also be deactivated by the base station 204 as further described herein, as represented by arrow 222. In response, the UE 202 may send an ACK to the base station, as represented by arrow 224.

At some point in time, if/when the UE 202 determines another set of UL gap preferences are preferable and a prohibition timer is not running (as represented by block 226), the UE may send another UAI that includes the new UL gap preferences of the UE. The base station 204 may then use such preferences for further activating/deactivating a UL gap based on the preferences, as further described herein.

As briefly described with respect to FIG. 2, a UE's preferences may be added to the otherConfig structure included within the base station's RRC reconfiguration message. As an example, the otherConfig structure may comprise the following:

```
OtherConfig-v17 ::== SEQUENCE {
    ulgaptype1-PreferenceConfig-r17   SetupRelease{ULgaptype1-
    PreferenceConfig-r17}
    ulgaptype2-PreferenceConfig-r17   SetupRelease{ULgaptype2-
    PreferenceConfig-r17}
}
    ULgaptype1-PreferenceConfig-r17 :== Sequence{
        ULgaptype1PreferenceProhibitTimer-r17 ENUMERATED {
    s0, s0dot5, s1, s2, s3, s4, s5, s6, s7, s8, s9, s10, s20, s30, spare2,
    spare1}
    }
}
    ULgaptype2-PreferenceConfig-r17 :== Sequence{
        ULgaptype2PreferenceProhibitTimer-r17 ENUMERATED {
    s0, s0dot5, s1, s2, s3, s4, s5, s6, s7, s8, s9, s10, s20, s30, spare2,
    spare1}
    }
```

Upon receiving the otherConfig structure, the UE may perform the following: 1. If the received otherConfig includes a ULgaptype1-PreferenceConfig: a. If ULgaptype1-PreferenceConfig is set to setup, the UE may determine that it is configured to provide its preference on the ULgapType1 for FR2; orb. If ULgaptype1-PreferenceConfig is not set to setup (i.e., else), the UE may determine that it is not configured to provide its preference on the ULgapType 1 configuration and stop a timer (i.e., T346x) associated with the cell group, if such timer is running; or 2. If the received otherConfig includes a ULgaptype2-PreferenceConfig: a. If ULgaptype2-PreferenceConfig is set to setup, The UE may determine that it is configured to provide its preference on the ULgapType2 for FR2; orb. If ULgaptype2-PreferenceConfig is not set to setup, the UE may determine that it is not configured to provide its preference on the ULgapType2 configuration and stop a timer (i.e., T346x) associated with the cell group, if such timer is running. Notably, the timer T346x may be a prohibition timer defined for various types of UE preference reporting (as further discussed with respect to block 226 of FIG. 2).

When the UE determines that a change to the UL gap configuration of FR2 is to be made, the UE may initiate transmission of a UAI message to provide the UE's new preferred UL gap configuration for transmit (Tx) power management. In such, embodiments, the UAI message may include ULgapTxpowerPreference to indicate the UE's new UL gap configuration preference(s). In an example, the following may apply:

```
UEAssistanceInformation-v17-IEs{
    ULgaptype1-preference-r17
    ULgaptype2-preference-r17
    ...
}
ULgaptype1-Preference-r17 ::= SEQUENCE {
    ULgaptype1-PreferenceConfig-r17 ::= {
        gapPatternConfig {1, 2,3, ... 4} optional
        Gaplength{ sl1,sl2, sl4, sl8} Optional
        gapPeriodcity {ms20, ms40, ms80, ms160}Optional
    }
    ULgaptype2-PreferenceConfig-r17 ::= {
        Gaplength{1sym,2sym} Optional
    }
}
```

Alternatively, the UAI may be initiated and transmitted by the UE per UL gap usage.

A given UE may determine its UL gap configuration preference according to the given UE's implementation. In an example, a UE can determine its preference(s) per gap type. In another example, a UE can determine its preference(s) per use case.

For Tx power management based on BPS, the preference may be based on one or more of the following: 1. BPS implementation, including: a. A number of samples to average per beam per panel; b. A total number of beams per panel; c. A total number of panels the UE has to monitor; and d. Measurements that are based on a given implementation (all measurements may be time division multiplexed within a total gap overhead and measured based on the given implementation); 2. A tradeoff between accuracy and UE throughput; and 3. Whether the UE can find BPS opportunities, which may be based on other network configurations (e.g., measurement gap).

Figure 3:
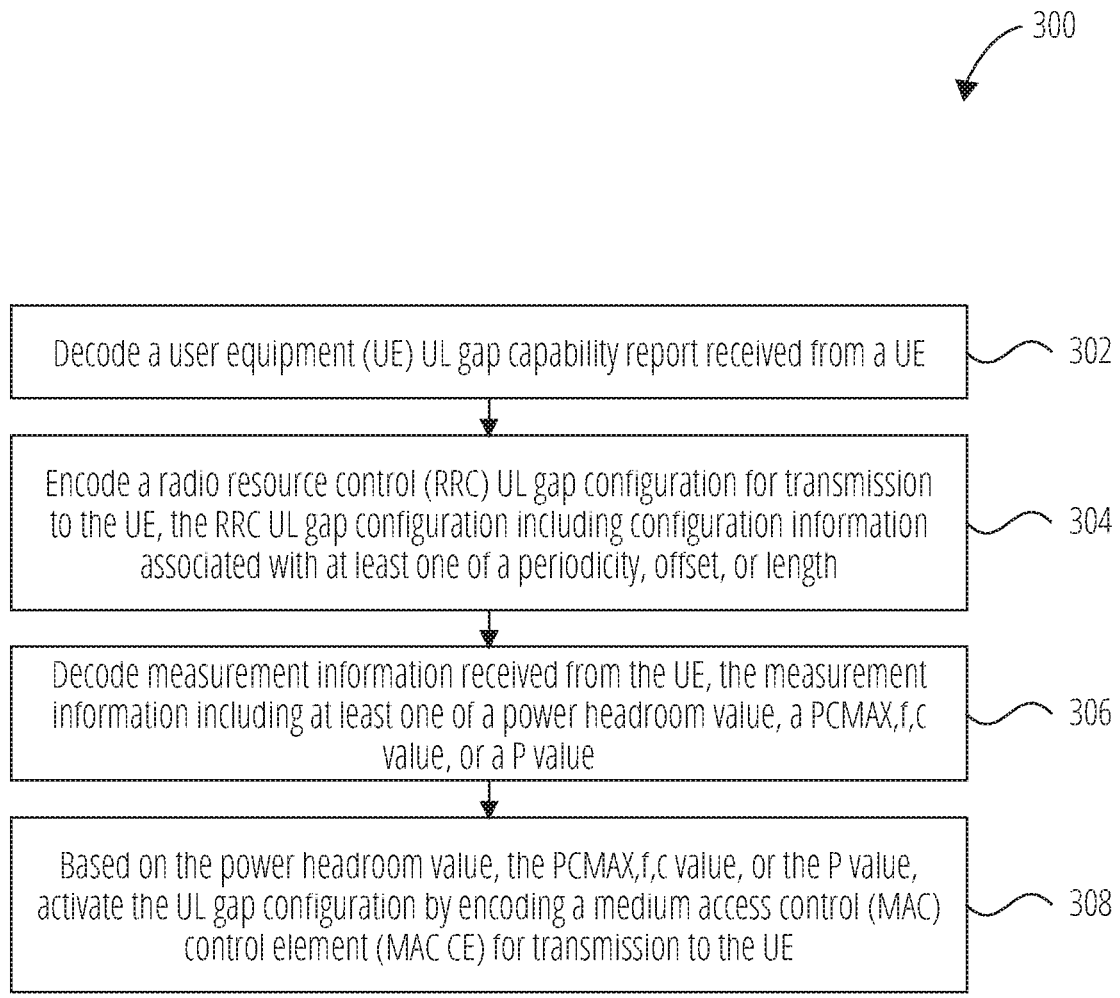
FIG. 3 illustrates a method for triggering an uplink gap at a base station in accordance with one embodiment.

FIG. 3 illustrates a flowchart of a method 300 for triggering a UL gap. In block 302, the method 300 decodes a user equipment (UE) UL gap capability report (may also include one or more preferences of the UE) received from a UE. For instance, a UE may provide a base station a preference associated with UL gap periodicity, offset, and/or length. In block 304, the method 300 encodes a radio resource control (RRC) UL gap configuration for transmission to the UE. The RRC UL gap configuration may include configuration information associated with at least one of a periodicity, offset, or length. In an example, the configuration information may be based on the preference(s) provided by the UE.

In block 306, the method 300 decodes measurement information received from the UE. The measurement information may include at least one of a power headroom value, a $P_{CMAX,f,c}$ value, or a P value. In block 308, the method 300, based on the power headroom value, the $P_{CMAX,f,c}$ value, or the P value, activates the UL gap configuration by encoding a medium access control (MAC) control element (MAC CE) for transmission to the UE. For instance, based on a particular trigger, the base station may activate the configured UL gap via MAC CE.

The method 300 may further include encoding a base station UL gap capability report for transmission to the UE, and in response to sending the base station UL gap capability report, decoding the user equipment UL gap capability preference report. The method 300 may further include, in response to receiving the UE capability report, encoding an RRC reconfiguration message that includes a data structure for the UE to provide UL gap configuration preference feedback, and decoding UE assisted information (UAI) received from the UE that includes a preferred gap pattern of the UE. The encoded RRC UL gap configuration may be based on the decoded UAI received from the UE.

The method 300 may further include decoding a UE UL gap preference report that utilizes the data structure to provide UL configuration preference feedback. The UE UL gap preference report may include at least one of a preference of the UE per UL gap use case or a preference of the UE per UL gap type. The method 300 may further include the UL gap configuration preference feedback of the UE being based on at least one of a body proximity sensing (BPS) implementation of the UE, a peak EIRP of the UE, a uplink downlink (ULDL) time division duplex (TDD) configuration, or a measurement gap configuration.

The method 300 may further include the UL gap configuration including at least one of a UL gap periodicity and a UL gap length. The method 300 may further include the measurement information comprising a reference signal received power (RSRP) report or a reference signal receive quality (RSRQ) report. The method 300 may further include the UE UL gap capability report including a sub-set of possible gap configurations, or a full set of possible UL gap configurations.

Embodiments contemplated herein include an apparatus comprising means to perform one or more elements of the method 300. This apparatus may be, for example, an apparatus of a base station (such as a network device 618 that is a base station, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a base station (such as a memory 622 of a network device 618 that is a base station, as described herein).

Embodiments contemplated herein include an apparatus comprising logic, modules, or circuitry to perform one or more elements of the method 300. This apparatus may be, for example, an apparatus of a base station (such as a network device 618 that is a base station, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a base station (such as a network device 618 that is a base station, as described herein).

Embodiments contemplated herein include a signal as described in or related to one or more elements of the method 300.

Embodiments contemplated herein include a computer program or computer program product comprising instructions, wherein execution of the program by a processing element is to cause the processing element to carry out one or more elements of the method 300. The processor may be a processor of a base station (such as a processor(s) 620 of a network device 618 that is a base station, as described herein). These instructions may be, for example, located in the processor and/or on a memory of the UE (such as a memory 622 of a network device 618 that is a base station, as described herein).

Figure 4:
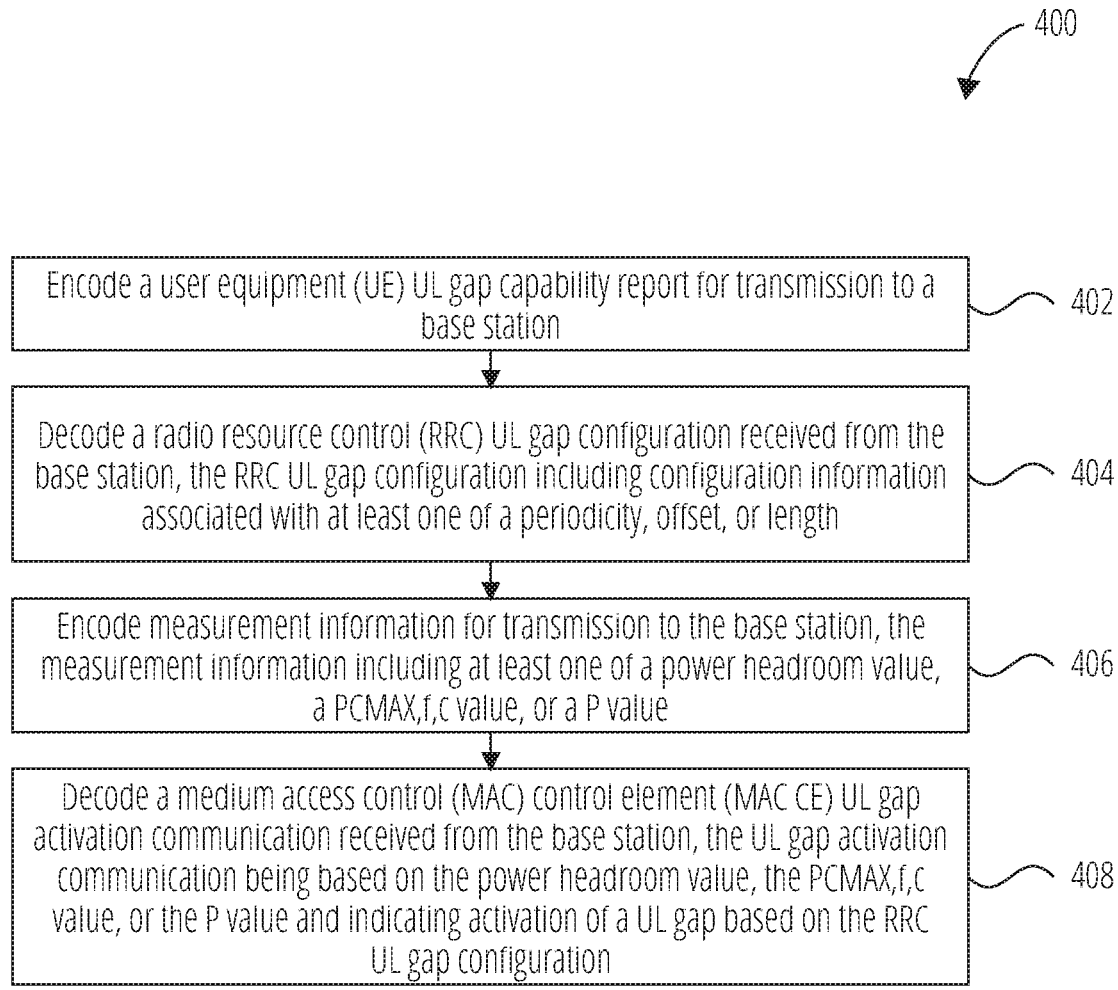
FIG. 4 illustrates a method for triggering an uplink gap at a user equipment in accordance with one embodiment.

FIG. 4 illustrates a flowchart of a method 400 for triggering a UL gap. In block 402, method 400 encodes a user equipment (UE) UL gap capability report for transmission to a base station. For instance, a UE may provide a base station a preference associated with UL gap periodicity, offset, and/or length. In block 404, the method 400 decodes a radio resource control (RRC) UL gap configuration received from the base station. The RRC UL gap configuration may include configuration information associated with at least one of a periodicity, offset, or length. In an example, the configuration information may be based on the preference(s) provided by the UE.

In block 406, the method 400 encodes measurement information for transmission to the base station. The measurement information may include at least one of a power headroom value, a $P_{CMAX,f,c}$ value, or a P value. In block 408, the method 400 decodes a medium access control (MAC) control element (MAC CE) UL gap activation communication received from the base station. The UL gap activation communication may be based on the power headroom value, the $P_{CMAX,f,c}$ value, or the P value and indicate activation of a UL gap based on the RRC UL gap configuration. For instance, based on a particular trigger, the base station may activate the configured UL gap via MAC CE.

The method 400 may further include decoding an RRC reconfiguration message received from the base station that includes a data structure for the UE to provide UL gap configuration preference feedback. The method 400 may further include, in response to receiving the RRC reconfiguration message, encoding a UE UL gap preference report using UE assisted information (UAI) for transmission to the base station that includes a preferred gap pattern of the UE. The RRC UL gap configuration may be based on the UE UL gap preference report encoded by the UE for transmission to the base station.

The method 400 may further include determining that the data structure includes a ULgaptype1-PreferenceConfig. When the ULgaptype1-PreferenceConfig is setup, a preference of the UE may be provided for frequency range 2 (FR2) to the base station, and when the ULgaptype1-PreferenceConfig is not setup, a timer associated with a corresponding cell group may be stopped. The method 400 may further include determining that the data structure includes a ULgaptype2-PreferenceConfig. When the ULgaptype2-PreferenceConfig is setup, a preference of the UE for frequency range 2 (FR2) may be provided to the base station, and when the ULgaptype2-PreferenceConfig is not setup, a timer associated with a corresponding cell group may be stopped.

The method 400 may further include dynamically encoding a UE UL gap preference report for transmission to the base station that includes at least one of a preference of the UE per UL gap use case or a preference of the UE per UL gap type. The method 400 may further include decoding a base station UL gap capability report received from the base station, and in response to receiving the base station UL gap capability report, encoding the user equipment UL gap capability report.

Embodiments contemplated herein include an apparatus comprising means to perform one or more elements of the method 400. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 400. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 602 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

Figure 5:
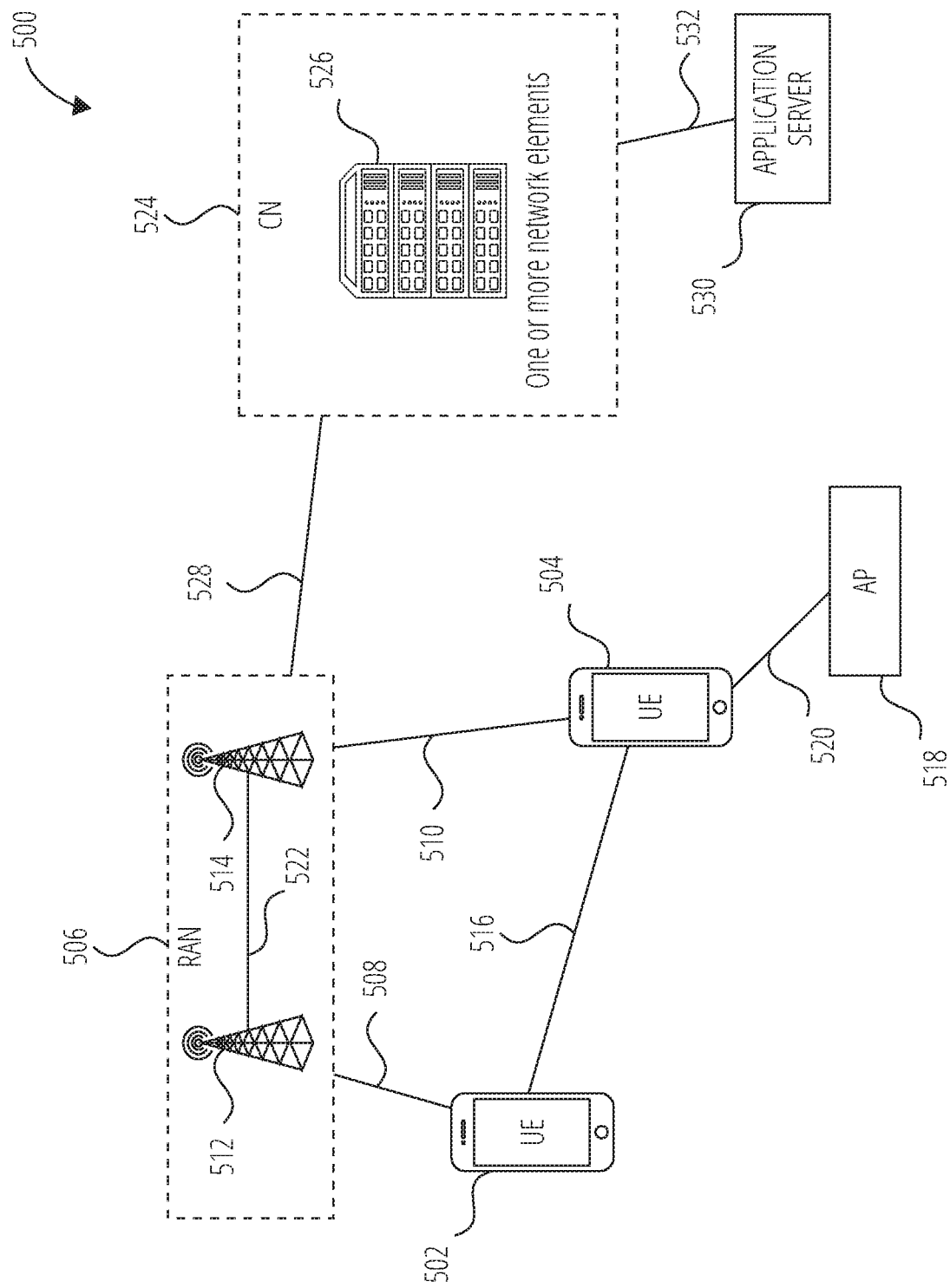
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to SGC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a SGC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
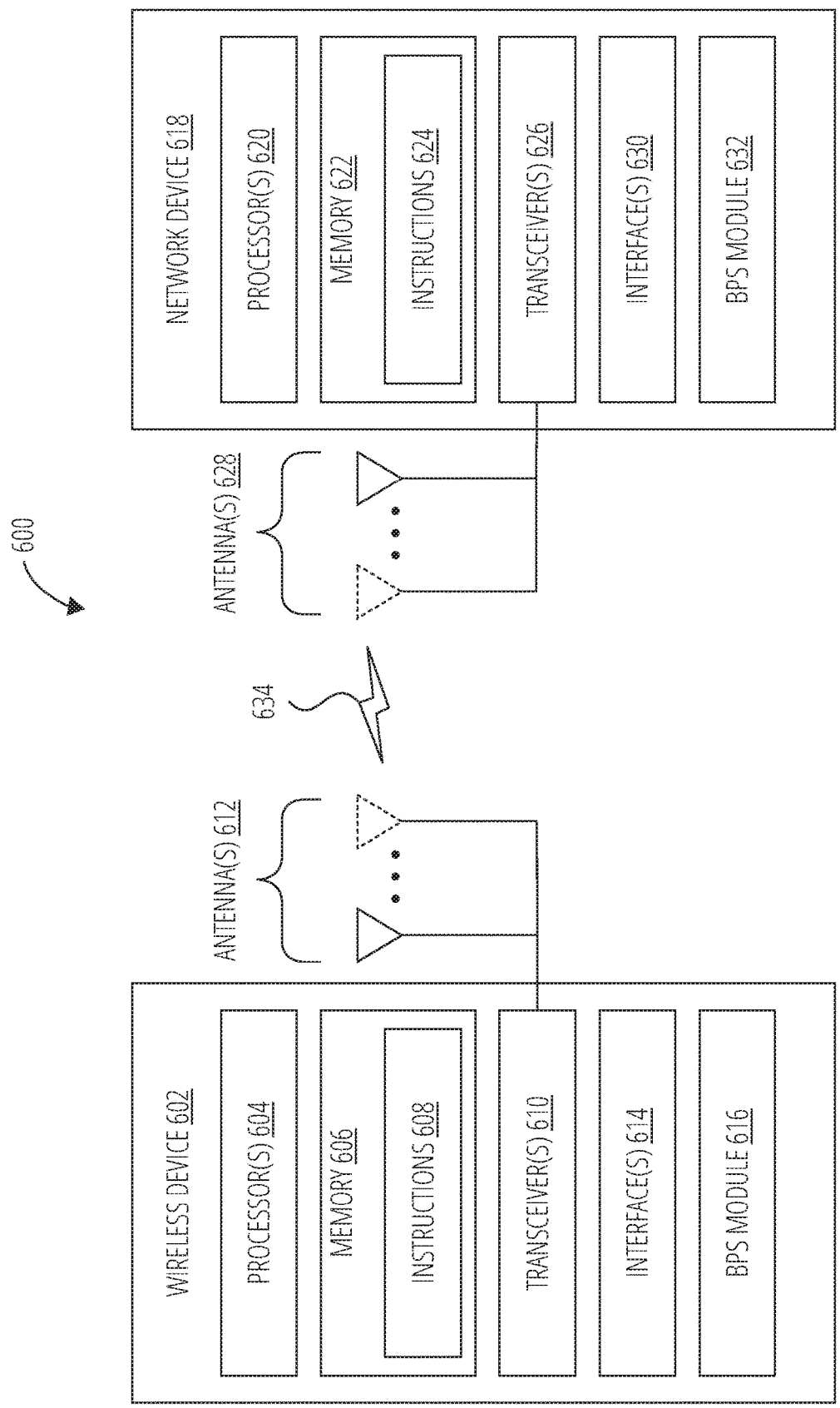
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver (s) 610/ antenna(s) 612 already described) that allow for communication between the UE and other devices and may operate according to known protocols (e.g., Wi-Fi®, Bluetooth®, and the like).

The wireless device 602 may include a BPS module 616. The BPS module 616 may be implemented via hardware, software, or combinations thereof. For example, the BPS module 616 may be implemented as a processor, circuit, and/or instructions 608 stored in the memory 606 and executed by the processor(s) 604. In some examples, the BPS module 616 may be integrated within the processor(s) 604 and/or the transceiver(s) 610. For example, the BPS module 616 may be implemented by a combination of software components (e.g., executed by a DSP or a general processor) and hardware components (e.g., logic gates and circuitry) within the processor(s) 604 or the transceiver(s) 610.

The BPS module 616 may be used for various aspects of the present disclosure, for example, aspects of FIGS. 1-4. The BPS module 616 is configured to identify capabilities and preferences of a UE associated with a UL gap and indicate such to a base station.

The network device 618 may include one or more processor(s) 620. The processor(s) 620 may execute instructions such that various operations of the network device 618 are performed, as described herein. The processor(s) 604 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/ antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a BPS module 632. The BPS module 632 may be implemented via hardware, software, or combinations thereof. For example, the BPS module 632 may be implemented as a processor, circuit, and/or instructions 624 stored in the memory 622 and executed by the processor(s) 620. In some examples, the BPS module 632 may be integrated within the processor(s) 620 and/or the transceiver(s) 626. For example, the BPS module 632 may be implemented by a combination of software components (e.g., executed by a DSP or a general processor) and hardware components (e.g., logic gates and circuitry) within the processor(s) 620 or the transceiver(s) 626.

The BPS module 632 may be used for various aspects of the present disclosure, for example, aspects of FIGS. 1-4.

The BPS 632 is configured to identify base station UL gap capabilities, identify UL gap capabilities/preferences of a UE, identify triggers of a UL gap, and activate a UL gap in response to an occurrence of UL gap triggers.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for triggering an uplink (UL) gap at a base station, the method comprising:
encoding a base station UL gap capability report for transmission to a user equipment (UE);
in response to sending the base station UL gap capability report, decoding a UE UL gap capability report received from the UE;
encoding a radio resource control (RRC) UL gap configuration for transmission to the UE, the RRC UL gap configuration including configuration information associated with at least one of a periodicity, offset, or length;
decoding measurement information received from the UE, the measurement information including at least one of a power headroom value, a configured maximum UE output power ($P_{CMAX,f,c}$) value for a carrier f of a serving cell c, or a metric (P) value indicating whether a power management maximum power reduction (P-MPR) is applied; and
based on the power headroom value, the $P_{CMAX,f,c}$ value, or the P value, activating the UL gap configuration by encoding a medium access control (MAC) control element (MAC CE) for transmission to the UE.

2. The method of claim 1, further comprising:
in response to receiving the UE capability report, encoding an RRC reconfiguration message that includes a data structure for the UE to provide UL gap configuration preference feedback; and
decoding UE assisted information (UAI) received from the UE that includes a preferred gap pattern of the UE, the encoded RRC UL gap configuration being based on the decoded UAI received from the UE.

3. The method of claim 2, further comprising decoding a UE UL gap preference report that utilizes the data structure to provide UL configuration preference feedback, the UE UL gap preference report including at least one of a preference of the UE per UL gap use case or a preference of the UE per UL gap type.

4. The method of claim 3, wherein the UL gap configuration preference feedback of the UE is based on at least one of a body proximity sensing (BPS) implementation of the UE, a peak EIRP of the UE, a uplink downlink (ULDL) time division duplex (TDD) configuration, or a measurement gap configuration.

5. The method of claim 1, wherein the UL gap configuration includes at least one of a UL gap periodicity and a UL gap length.

6. The method of claim 1, wherein the measurement information comprises a reference signal received power (RSRP) report or a reference signal receive quality (RSRQ) report.

7. The method of claim 1, wherein the UE UL gap capability report includes a sub-set of possible gap configurations, or a full set of possible UL gap configurations.

8. A method for triggering an uplink (UL) gap at a user equipment (UE), the method comprising:
encoding a UE UL gap capability report for transmission to a base station;
decoding a radio resource control (RRC) UL gap configuration received from the base station, the RRC UL gap configuration including configuration information associated with at least one of a periodicity, offset, or length;
encoding measurement information for transmission to the base station, the measurement information including at least one of a power headroom value, a configured maximum UE output power ($P_{CMAX,f,c}$) value for a carrier f of a serving cell c, or a metric (P) value indicating whether a power management maximum power reduction (P-MPR) is applied;

decoding a medium access control (MAC) control element (MAC CE) UL gap activation communication received from the base station, the UL gap activation communication being based on the power headroom value, the $P_{CMAX,f,c}$ value, or the P value and indicating activation of a UL gap based on the RRC UL gap configuration; and decoding an RRC reconfiguration message received from the base station that includes a data structure for the UE to provide UL gap configuration preference feedback.

9. The method of claim 8, further comprising, in response to receiving the RRC reconfiguration message, encoding a UE UL gap preference report using UE assisted information (UAI) for transmission to the base station that includes a preferred gap pattern of the UE, the RRC UL gap configuration being based on the UE UL gap preference report encoded by the UE for transmission to the base station.

10. The method of claim 8, further comprising:
   determining that the data structure includes a ULgaptype1-PreferenceConfig;
   when the ULgaptype1-PreferenceConfig is setup, providing a preference of the UE for frequency range 2 (FR2) to the base station; and
   when the ULgaptype1-PreferenceConfig is not setup, stopping a timer associated with a corresponding cell group.

11. The method of claim 8, further comprising:
   determining that the data structure includes a ULgaptype2-PreferenceConfig;
   when the ULgaptype2-PreferenceConfig is setup, providing a preference of the UE for frequency range 2 (FR2) to the base station; and
   when the ULgaptype2-PreferenceConfig is not setup, stopping a timer associated with a corresponding cell group.

12. The method of claim 8, further comprising dynamically encoding a UE UL gap preference report for transmission to the base station that includes at least one of a preference of the UE per UL gap use case or a preference of the UE per UL gap type.

13. The method of claim 8, further comprising:
   decoding a base station UL gap capability report received from the base station; and
   in response to receiving the base station UL gap capability report, encoding the UE UL gap capability report.

14. A user equipment (UE) comprising:
   a processor; and
   a memory storing instructions that, when executed by the processor, configure the processor to:
   encode a UE UL gap capability report for transmission to a base station;
   decode a radio resource control (RRC) UL gap configuration received from the base station, the RRC UL gap configuration including configuration information associated with at least one of a periodicity, offset, or length;
   encode measurement information for transmission to the base station, the measurement information including at least one of a power headroom value, a configured maximum UE output power ($P_{CMAX,f,c}$) value for a carrier f of a serving cell c, or a metric (P) value indicating whether a power management maximum power reduction (P-MPR) is applied;
   decode a medium access control (MAC) control element (MAC CE) UL gap activation communication received from the base station, the UL gap activation communication being based on the power headroom value, the $P_{CMAX,f,c}$ value, or the P value and indicating activation of a UL gap based on the RRC UL gap configuration; and
   decode an RRC reconfiguration message received from the base station that includes a data structure for the UE to provide UL gap configuration preference feedback.

15. The UE of claim 14, the memory further storing instructions, that when executed by the processor, configure the processor to, in response to receiving the RRC reconfiguration message, encode a UE UL gap preference report using UE assisted information (UAI) for transmission to the base station that includes a preferred gap pattern of the UE, the RRC UL gap configuration being based on the UE UL gap preference report encoded by the UE for transmission to the base station.

16. The UE of claim 14, the memory further storing instructions, that when executed by the processor, configure the processor to:
   determine that the data structure includes a ULgaptype1-PreferenceConfig;
   when the ULgaptype1-PreferenceConfig is setup, provide a preference of the UE for frequency range 2 (FR2) to the base station; and
   when the ULgaptype1-PreferenceConfig is not setup, stop a timer associated with a corresponding cell group.

17. The UE of claim 14, the memory further storing instructions, that when executed by the processor, configure the processor to:
   determine that the data structure includes a ULgaptype2-PreferenceConfig;
   when the ULgaptype2-PreferenceConfig is setup, provide a preference of the UE for frequency range 2 (FR2) to the base station; and
   when the ULgaptype2-PreferenceConfig is not setup, stop a timer associated with a corresponding cell group.

* * * * *